(12) United States Patent
Dane et al.

(10) Patent No.: US 6,385,228 B1
(45) Date of Patent: May 7, 2002

(54) COHERENT BEAM COMBINER FOR A HIGH POWER LASER

(75) Inventors: C. Brent Dane; Lloyd A. Hackel, both of Livermore, CA (US)

(73) Assignee: The Regents of the University of California, Oakland, CA (US)

(*) Notice: Subject to any disclaimer, the term of this patent is extended or adjusted under 35 U.S.C. 154(b) by 0 days.

(21) Appl. No.: 09/495,019

(22) Filed: Jan. 31, 2000

Related U.S. Application Data

(60) Provisional application No. 60/117,768, filed on Jan. 29, 1999.

(51) Int. Cl.[7] .............. H01S 3/08; H01S 3/081; H01S 3/00; G02B 26/08
(52) U.S. Cl. .............. 372/99; 372/92; 372/93; 359/300; 359/334; 359/338; 359/346; 359/349
(58) Field of Search .............. 372/21, 92, 93, 372/99; 359/300, 334, 338, 346, 349

(56) References Cited

U.S. PATENT DOCUMENTS 5,880,873 A * 3/1999 Dane et al. .............. 359/300

\* cited by examiner

*Primary Examiner*—Frank G. Font
*Assistant Examiner*—Armando Rodriguez
(74) *Attorney, Agent, or Firm*—John P. Wooldridge; Alan H. Thompson

(57) ABSTRACT

A phase conjugate laser mirror employing Brillouin-enhanced four wave mixing allows multiple independent laser apertures to be phase locked producing an array of diffraction-limited beams with no piston phase errors. The beam combiner has application in laser and optical systems requiring high average power, high pulse energy, and low beam divergence. A broad range of applications exist in laser systems for industrial processing, especially in the field of metal surface treatment and laser shot peening.

20 Claims, 5 Drawing Sheets

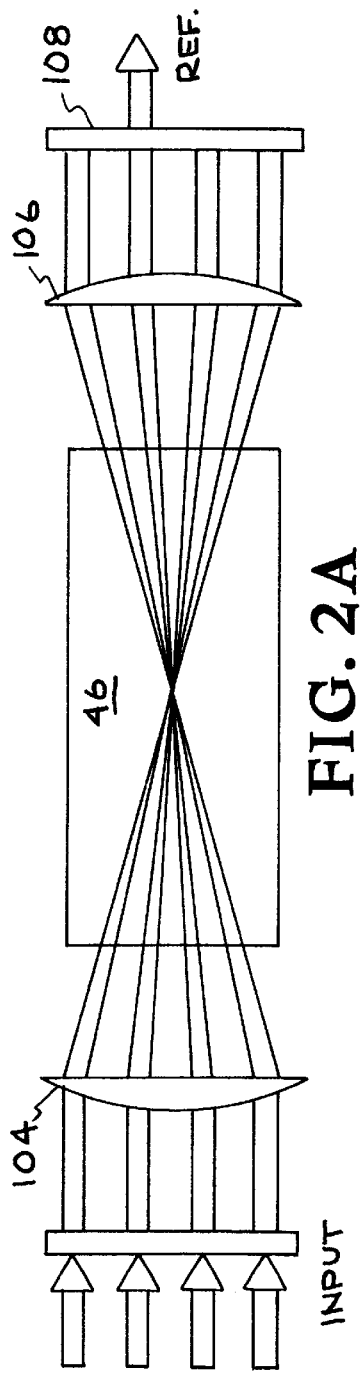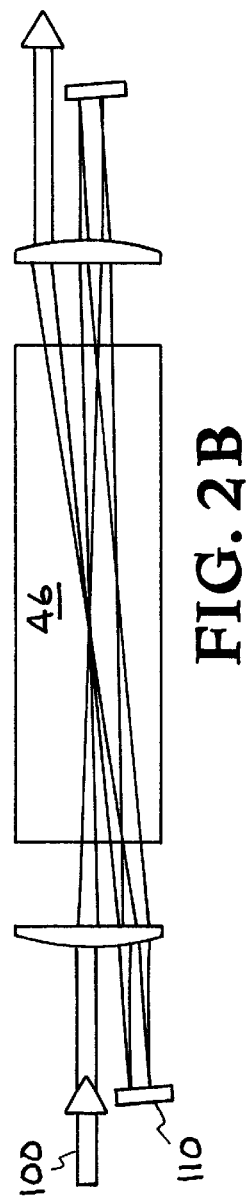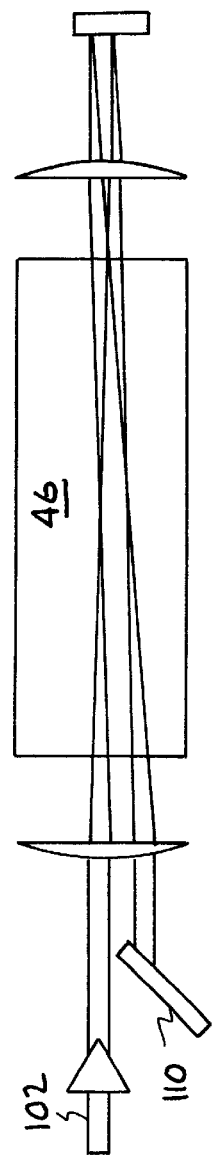

COHERENT BEAM COMBINER FOR A HIGH POWER LASER

This application claims priority to provisional patent application Ser. No. 60/117,768, filed Jan. 29, 1999, titled "Coherent Beam Combiner For A High Power Laser."

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to a phase conjugate laser mirror employing Brillouin-enhanced four wave mixing which allows multiple independent laser apertures to be phase locked producing an array of diffraction-limited beams with no piston phase errors.

2. Description of Related Art

Phase conjugate mirrors employing Stimulated Brillouin Scattering (SBS) have become very useful and in some cases essential in high power laser systems. These mirrors, placed at the end of an amplifier chain somewhere in the mid-range of the amplification path, reflect the light with a phase wave front that is nearly exactly the inverse of that of the incoming laser beam. The reflected light retraces its path through the amplifiers, canceling out any wave front distortions that accumulated in the forward direction. This results in near aberration free output beams that exhibit the minimum beam divergence allowed by optical diffraction, hence the description "diffraction-limited."

The mechanism responsible for the reflectivity of the SBS mirrors is the generation of an intense acoustic wave inside the SBS nonlinear material. This acoustic wave serves as a very efficient Bragg grating which reflects the incoming light. Since the acoustic grating travels at the speed of sound through the material, in the same direction as the input light, the reflected light is frequency shifted from the input light by 100 MHz to >10 GHz, depending on the SBS medium. The frequency shifted output is referred to as the Stokes wave and the frequency shift is referred to as the Stokes shift. The active material for the conjugators has most often been a liquid or high pressure gas. A stimulated Brillouin scattering (SBS) phase conjugate laser mirror which uses a solid-state nonlinear gain medium instead of the conventional liquid or high pressure gas medium is disclosed in U.S. Pat. No. 5,689,363, incorporated herein by reference.

Scaling of solid state lasers to high energy and high average power is often limited by the maximum cross sectional size of the gain medium that can still provide acceptable wavefront in the presence of strong thermal loading. To achieve more output energy, a larger gain medium volume is needed but increasing the volume in most practical manners decreases waste heat Extraction efficiency.

SUMMARY OF THE INVENTION

The present invention is a technique in which multiple beams from separate laser amplifiers can be combined into a single phase locked beam. Using standard phase conjugator materials such as liquids (CC14, fluorinert) and high pressure gases (100 atmospheres of V2 or Xe), this technique can be used for relatively long pulses of 200 ns to over 1 ms and for shorter pulses in the 1 to 200 ns range. The technique can be used for pulses in the sub-nanosecond range, provided a sufficiently fast response (broad-bandwidth) phase conjugation medium is employed. The physical dimensions of the system must be sized so that the round trip path through the combiner does not exceed the physical length of the pulse (the beam must overlap itself within the combiner). In addition to phase locking the beams in each of the individual beam paths, the technique corrects for wavefront distortion introduced by thermally-loaded amplifiers and passive errors in other optical components.

The present technique overcomes limitations, especially in temporal phase instability, that were encountered by previous inventions employing only a simple focusing SBS setup. In earlier approaches, multiple beams were focused into a single SBS cell with an attempt to overlap all of the foci. Good spatial overlap, however, is generated only over relatively small volumes. In contrast, the present invention folds the beams within the SBS cell, causing them to cross paths multiple times. This SBS phase conjugate mirror design provides for overlap between the first and third (last) foci in the SBS medium. Once the SBS process is above threshold, the four wave mixing interaction at this crossing causes Stokes shifted light to be scattered from the input beam around the optical loop and directly into the Stokes output beam. Since this establishes "closed-loop" operation, the nonlinear process no longer depends on noise to sustain the reflected Stokes beam and becomes very stable for the duration of the input pulse. In the absence of the optical architecture of this invention, temporal phase instabilities were the key problem that has prevented the successful operation of an SBS phase locking mirror.

This invention has a basis-in U.S. Pat. No. 5,689,363, incorporated herein by reference, where the architecture is described for a high energy, high average power laser system employing a single frequency oscillator and a Nd:glass amplifier. The patent discusses a four-wave mixing SBS phase conjugator that reduces the threshold for SBS initiation and reliably phase conjugates a beam with a pulse duration of >1 ns. Also briefly mentioned in the patent is the idea of combining multiple beams in a single 4-wave mixing phase conjugator. The present invention provides a more robust extension to phase locking of multiple beams, the technique of using a "comb" mirror optical architecture and the extension of this concept to shorter laser pulses.

BRIEF DESCRIPTION OF THE DRAWINGS

FIGS. 2A–C show the beams entering the conjugator horizontally, propagating over the top of the input mirror, through one of a pair of confocal lenses and focusing inside the cell.

DETAILED DESCRIPTION OF THE INVENTION

Figure 1:
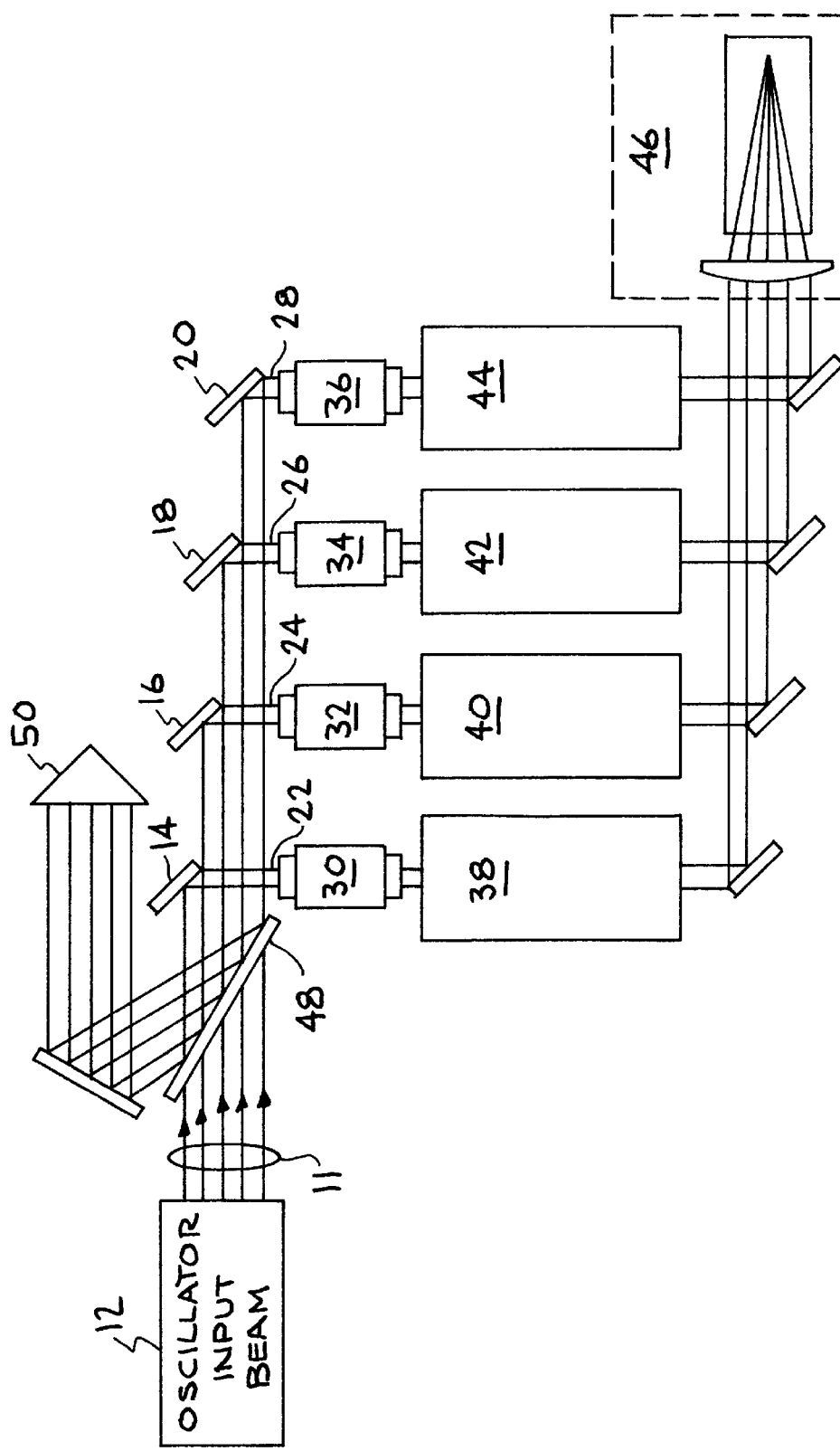
FIG. 1 shows the output of a single frequency master oscillator split into four beams, and directed through separate amplifier chains.

This invention combines multiple beams (four in the case of the incorporated patent, but not limited to four) into a single phase locked output beam. As shown in FIG. 1, the output 11 of a single frequency master oscillator 12 is split by beamsplitters 14, 16, 18, and 20 into four beams 22, 24, 26 and 28, and directed through separate Faraday isolators 30, 32, 34 and 36 amplifier chains 38, 40, 42 and 44. The present invention provides new ways for combining the four beams within the SBS phase conjugator 46.

In the present invention, the beams are then recombined into a single phase conjugator 46 and routed in a Brillouin-enhanced four wave mixing optical loop, as shown in FIGS. 2A–C. As shown in FIG. 2B, the reference beam 100 is made to pass through the cell 3 times, with its third pass focus overlapping the focus point of the first pass beam. All beams, including the reference, overlap in a first and second focus. Until the SBS process reaches threshold, the beams transmit through the cell, with the reference beam exiting after three focus passes as shown in FIG. 2b, and the other beams 102 exiting to a beam block 110 after 2 focus passes (FIG. 2C). Once the SBS begins to function as a phase locking mirror, all beams are reflected, phase locked in phase to each other, back along their input path. Referring again to FIG. 1, after reflecting from SBS phase conjugator 46, each beam retraces its path and is reflected by polarizing beamsplitter 48 out of the system as a spatially coherent phase-locked output beam 50.

Figure 2D:
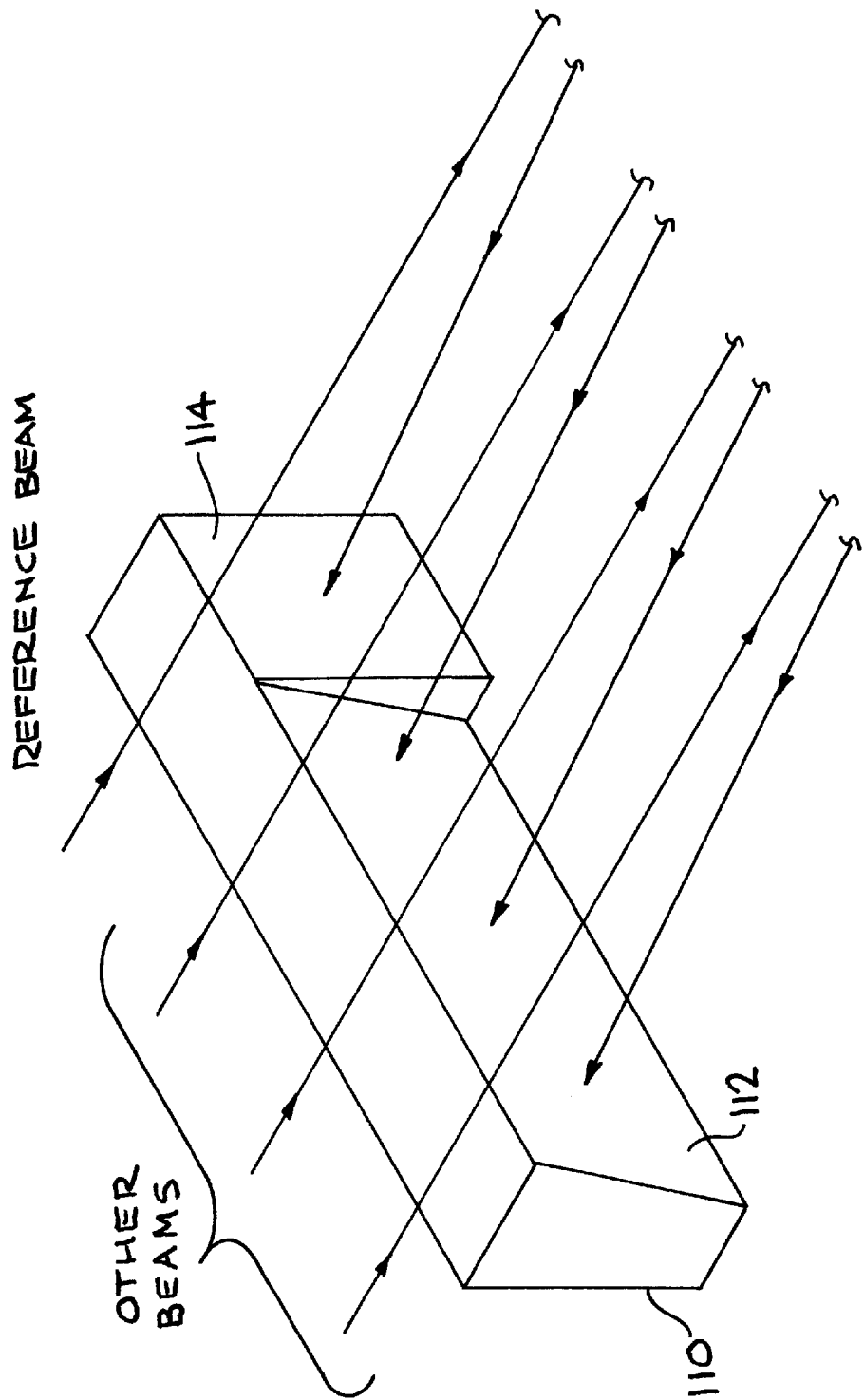
FIG. 2D shows a combined beam block/high reflector of the present invention.

From FIGS. 2A–C, it is seen that the beams enter the conjugator horizontally, propagate over the top of the second pass HR mirror/beam block mirror, propagate through one of a pair of confocal lenses 104 and focus inside the cell. The beams come through focus, pass through a second lens 106 which recollimates them and then hit the rear mirror 108 and are reflected back through the lens and focused in the cell again. In one embodiment, this is accomplished by the use of an integral beam block/high reflector (HR) mirror 110 (as shown in FIG. 2D) which includes a beam block portion 112 and an HR portion 114. The beams exit the cell and the lens and then all but one beam is blocked from reentry into the cell. One beam is selected to be reflected back through the lens and into the cell. This beam is made to focus at the initial multiple beam overlap point, forms a four-wave mixing interaction and generates a reflected array of beams that are all phase locked to each other after they retrace their paths through the amplifier chains and are rejoined in the output.

This technique works to phase lock the beams but can be limited in specific setups such as in amplifiers that are comprised of rectangular slabs of modest or large (10:1) height to width aspect ratio and in which the beams are zig-zagged through the amplifiers in the width dimension. In this case, as the repetition rate of the laser is increased and hence the power loading to the slab amplifiers, the distortions of the slabs in the non-zig-zag (vertical) dimension can impart distortions on the wavefront that spread the beams in the vertical dimension and can cause portions of the beams (and consequently the phase information) to be clipped by the first or second high reflecting mirror. Beam spread due to wavefront errors is minimized at the input to the SBS mirror by optically relaying an image of the amplifier aperture to the first SBS loop mirror. However, propagation in the three passes through the SBS medium takes the beam out of the relay image plane and can cause beam distortions that increase the size of the beam. This causes a loss of beam aperture, energy, and phase information which, at the highest average powers of the laser amplifier system, undesirably degrades performance.

Figure 3A:
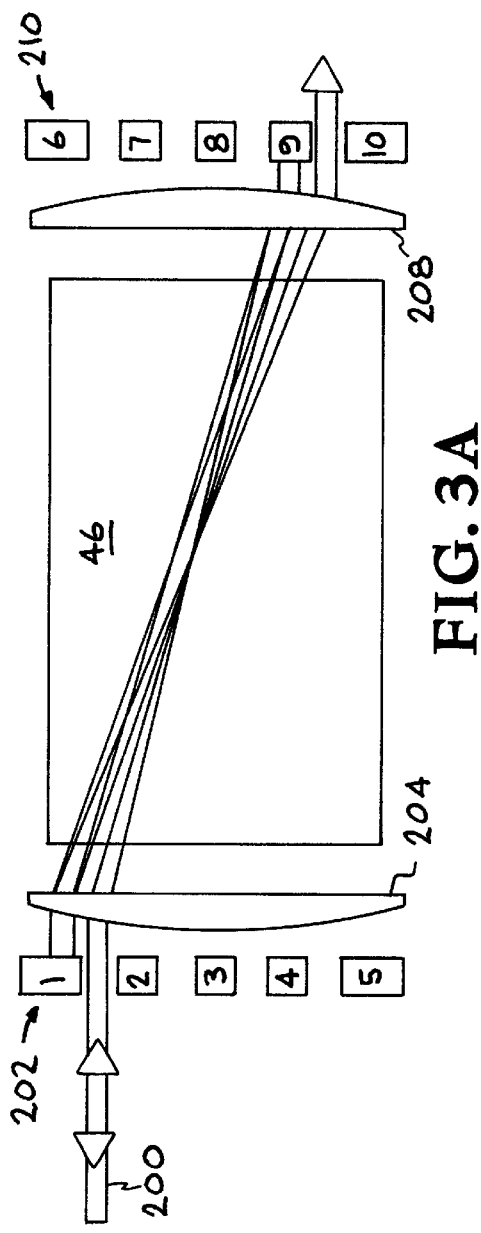
FIG. 3A shows the beam path for a single input beam.

The problem can be solved with a unique "comb" mirror and a beam setup that enables multiple beams to be combined in a 4-wave mixing architecture that results in good beam mixing and hence highly robust and reliable phase conjugation. The comb mirror architecture and a beam path is shown in FIG. 3A. An input beam 200 passes between teeth 1 and 2 of comb mirror 202, to be focussed at a first focus point by lens 204 of a confocal 1:1 telescope. This foci is located near the center of SBS cell 206. The beam is then recollimated by lens 208, is reflected from tooth 9 of comb mirror 210. This reflected beam again passes through lens 208 which brings the beam to a second focus point in the SBS cell 46 after which the beam is recollimated by lens 204 to reflect from tooth 1 of comb mirror 202. This reflected beam again passes through lens 204 which brings the beam to a focus which overlaps the first focus point, after which the beam expands, is recollimated by lens 208 and exits the system between teeth 9 and 10 of comb mirror 210. In a similar manner, beams which enter the system between any of the pairs of teeth of comb mirror 202 will be focussed onto the first focus point, reflected by one of the teeth of comb mirror 208 and focussed onto the second focus point to then be reflected by one of the teeth of comb mirror 202 to overlap the first focal point. When more than one beam enters the system between different pairs of the teeth of the comb mirror 102, the corresponding reflected beams from comb mirror 110 will overlap at the second focus point.

Figure 3B:
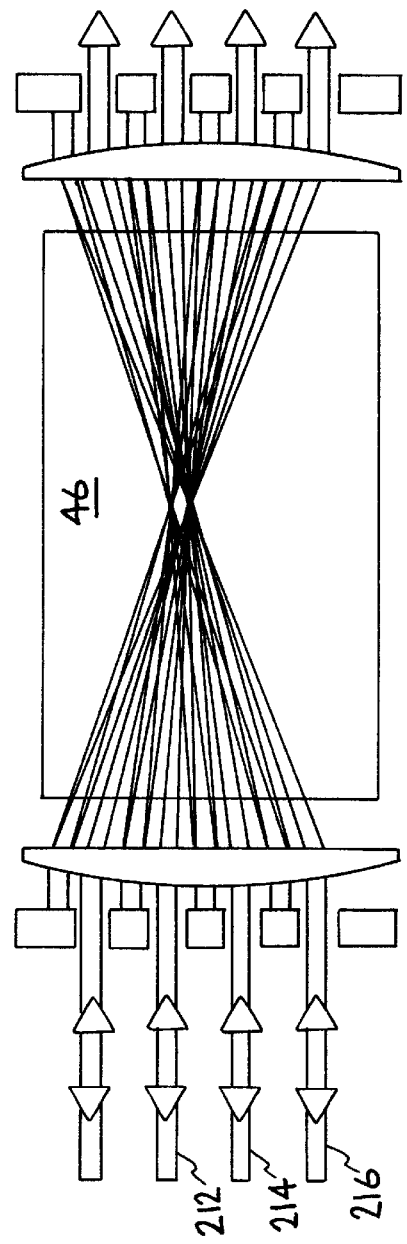
FIG. 3B shows the beam paths for four input beams.

FIG. 3B shows the SBS phase conjugator system of FIG. 3A with three additional input beams 212, 214 and 216. The figure illustrates the overlapping foci of the first and third passes of each beam and further illustrates the overlapping foci of each beam's second pass. Input beam 200 enters between teeth 1 and 2 and exits between teeth 9 and 10. Input beam 212 enters between teeth 2 and 3 and exits between teeth 8 and 9. Input beam 214 enters between teeth 3 and 4 and exits between teeth 7 and 8. Input beam 216 enters between teeth 4 and 5 and exits between teeth 6 and 7. The SBS phase conjugator system has been described using comb mirrors having 5 teeth for a system having 4 input beams; however, comb mirrors having any greater number of teeth for use in a SBS phase conjugator system are contemplated and taught by the present invention.

Figure 4:
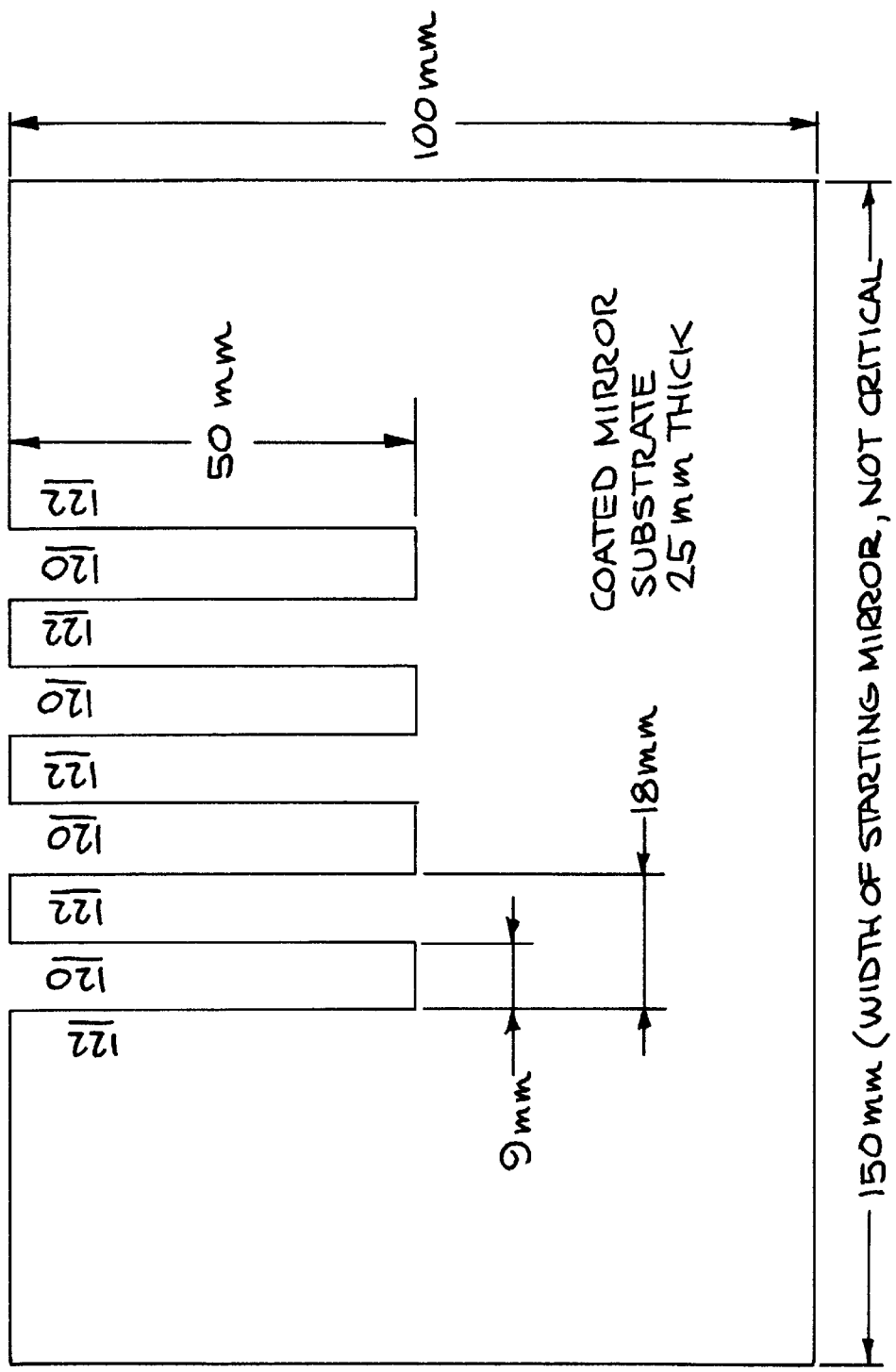
FIG. 4 shows an embodiment of the comb mirror with cutout sections that allow passage of the input beam and reflective areas that reflect one or more beams back for a third pass through the phase conjugator.

As indicated by its name, the comb mirror itself, shown in one embodiment in FIG. 4, has cutout sections 120 that allow the input beam to pass and reflective areas 122 that reflect one or more beams back for a third pass through the phase conjugator. The cut outs can be actual physical cut outs in the mirror substrate or transparent windows in the reflective coating of a solid mirror substrate. Because of the zig-zag nature of the amplifier, thermal loading spreads the beams in the vertical dimension but negligibly in the horizontal. The vertical spreading of the beams is accommodated by the large vertical cut outs and because of the near total lack of spread of the beams in the horizontal dimension, the beams pass completely through the comb cut outs at all power loadings. It is found that exact overlap of the beams at the foci in not critical, requiring only coincidence to within ~10 focal spot diameters. One embodiment of the comb mirror is about 150 mm by 100 mm and the comb cut outs are 9 mm by 50 mm.

Although originally designed to accommodate the larger aberrations in the vertical dimension of the input beams, the comb mirror architecture is found to greatly improved multi-beam locking performance under all conditions. This is attributed to the fact that the multiple beams are focused into the SBS gain medium and the four wave mixing loop is all formed by horizontal beam deflections, keeping all of the input beams and subsequent folded passes approximately in a single plane. This improves overlap and mixing between the beams where weak four wave mixing interactions, even at lower intensities away from focus, contribute to the improvement in overall stability.

In order to achieve phase locking in a relatively long pulse laser, high pressure gasses that have an acoustic response time in the range of 15 ns are the preferred SBS gain media. Gases can include nitrogen or xenon at 40 to 100 atmospheres pressure. For shorter pulses, where a faster response time medium is required (typically <1 ns) the preferred SBS gain media may be a liquid, e.g., Carbon tetrachloride and certain freon or fluorinerts. In all, this four wave mixing/comb mirror phase locking technique can produce solidly phase locked beams for short and long pulse laser amplifier systems.

The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the particular use contemplated. The scope of the invention is to be defined by the following claims.

What is claimed is:

1. A Stimulated Brillouin Scattering (SBS) phase conjugator, comprising:
   a pair of highly reflecting comb mirrors, comprising a first comb mirror and a second comb mirror, wherein said first comb mirror and said second comb mirror have their mirrored surfaces facing each other;
   a confocal lens pair placed between said pair of highly reflecting comb mirrors, wherein said confocal lens pair together with said pair of highly reflecting comb mirrors form a doubly resonant configuration and wherein the first and third foci of a beam input to said confocal lens pair overlap; and
   a SBS gain medium placed between said confocal lens pair.

2. The Stimulated Brillouin Scattering (SBS) phase conjugator of claim 1, wherein said confocal lens pair comprises a confocal 1:1 telescope.

3. The Stimulated Brillouin Scattering (SBS) phase conjugator of claim 1, wherein beams which enter said conjugator between any of the pairs of teeth of said first comb mirror will be focussed onto a first focus point, reflected by one of the teeth of said second comb mirror and focussed onto a second focus point to then be reflected by one of the teeth of said first comb mirror to overlap said first focal point.

4. The Stimulated Brillouin Scattering (SBS) phase conjugator of claim 3, wherein multiple beams entering said conjugator between different pairs of the teeth of said first comb mirror will be reflected from said second comb mirror to overlap at said second focus point.

5. The Stimulated Brillouin Scattering (SBS) phase conjugator of claim 1, wherein said first comb mirror and said second comb mirror comprise reflective teeth separated by optically transmissive portions.

6. The Stimulated Brillouin Scattering (SBS) phase conjugator of claim 5, wherein said optically transmissive portions comprise actual physical cut outs from the mirror substrate of each said comb mirror.

7. The Stimulated Brillouin Scattering (SBS) phase conjugator of claim 5, wherein said optically transmissive portions comprise transparent windows in the reflective coating of a solid mirror substrate of each said comb mirror.

8. The Stimulated Brillouin Scattering (SBS) phase conjugator of claim 5, wherein thermal loading within said conjugator spreads beams in dimension of said transmissive portions but negligibly in a dimension orthogonal thereto, wherein the spreading of the beams is accommodated by said transmissive portions and because of the near total lack of spread of the beams in the dimension orthogonal thereto, the beams pass completely through said transmissive portions at all power loadings.

9. The Stimulated Brillouin Scattering (SBS) phase conjugator of claim 1, wherein overlap within said conjugator of the beams are coincidence to within ~10 focal spot diameters.

10. The Stimulated Brillouin Scattering (SBS) phase conjugator of claim 1, wherein said comb mirror is about 150 mm by 100 mm and said comb mirror comprises transmissive portions separating reflective portions, wherein said transmissive portions are about 9 mm by 50 mm.

11. The Stimulated Brillouin Scattering (SBS) phase conjugator of claim 1, wherein said SBS gain medium comprises high pressure gases which have an acoustic response time in the range of 15 ns for use when phase locking in a relatively long pulse laser is desired.

12. The Stimulated Brillouin Scattering (SBS) phase conjugator of claim 11, wherein said gases are selected from a group consisting of nitrogen and xenon.

13. The Stimulated Brillouin Scattering (SBS) phase conjugator of claim 12, wherein said gases are at 40 to 100 atmospheres pressure.

14. The Stimulated Brillouin Scattering (SBS) phase conjugator of claim 1, wherein said SBS gain medium comprises a liquid for pulses <1 ns.

15. The Stimulated Brillouin Scattering (SBS) phase conjugator of claim 14, wherein said liquid is selected from a group consisting of Carbon tetrachloride, freon and fluorinerts.

16. A Stimulated Brillouin Scattering (SBS) phase conjugate mirror, comprising:
   a pair of comb mirrors having their mirrored surfaces facing each other;
   a confocal lens pair placed between said pair of comb mirrors, wherein said confocal lens pair together with said pair of comb mirrors form a doubly resonant configuration and wherein the first and third foci of an beam input between the teeth of said comb mirror overlap; and
   a SBS gain medium placed between said confocal lens pair.

17. A Stimulated Brillouin Scattering (SBS) phase conjugate mirror, comprising:
   a pair of highly reflecting comb mirrors having their mirrored surfaces facing each other;
   a confocal lens pair placed between said pair of high reflectors, wherein said confocal lens pair together with said pair of high reflectors form a doubly resonant configuration incorporating any number of gain passes greater than or equal to 3 distributed in two overlapping regions; and
   a SBS gain medium placed between said confocal lens pair.

18. A solid-state Stimulated Brillouin Scattering (SBS) phase conjugate mirror, comprising:

a SBS gain medium:

a doubly resonant configuration incorporating any number of gain passes greater than or equal to 3 distributed in two overlapping regions within said solid-state SBS gain medium.

19. A method for reducing temporal phase instabilities in a laser pulse, comprising:

producing a laser pulse; and focussing said laser beam into a solid-state Stimulated Brillouin Scattering (SBS) gain medium comprising a doubly-resonant SBS configuration which incorporates a first comb mirror and a second comb mirror and two separate focal points in said solid-state SBS gain medium, wherein temporal phase instabilities are reduced during the stimulated scattering process that occurs within said SBS gain medium when said laser pulse propagates on said doubly resonant configuration.

20. The method of claim 19, wherein beams which enter said conjugator between any of the pairs of teeth of said first comb mirror will be focussed onto a first focus point, reflected by one of the teeth of said second comb mirror and focussed onto a second focus point to then be reflected by one of the teeth of said first comb mirror to overlap said first focal point, wherein multiple beams entering said conjugator between different pairs of the teeth of said first comb mirror will be reflected from said second comb mirror to overlap at said second focus point.

* * * * *